Figure 1:
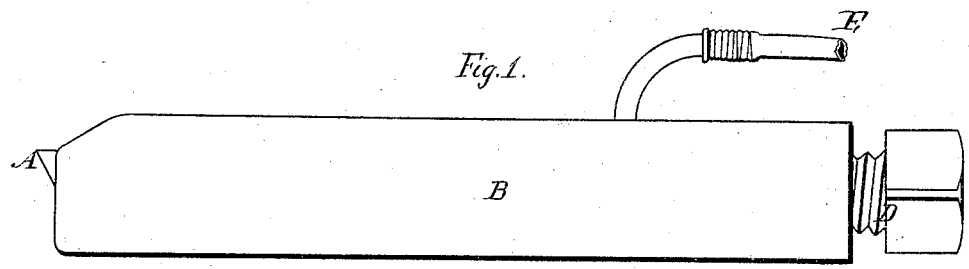

T. T. LINGARD.
METAL TURNING AND PLANING TOOLS.

No. 178,170. Patented May 30, 1876.

WITNESSES
W. Lloyd West
F. J. Brougham

INVENTOR
T. Taylor Lingard

UNITED STATES PATENT OFFICE.

THOMAS TAYLOR LINGARD, OF MANCHESTER, ENGLAND.

IMPROVEMENT IN METAL TURNING AND PLANING TOOLS.

Specification forming part of Letters Patent No. 178,170, dated May 30, 1876; application filed July 20, 1875.

*To all whom it may concern:*

Be it known that I, THOMAS TAYLOR LINGARD, of Manchester, in the county of Lancaster, England, Kingdom of Great Britain and Ireland, engineer, have invented Improvements in Machine Cutting-Tools and holders for carrying the same, of which the following is a specification:

My invention relates to the use, in machines for operating upon metal and other substances, of tools (in conjunction with suitable holders) whose cutting portions are each made so as to have three or more angular sides or parts, meeting in the form of a point or cutting-edge.

The tools may be made in the form of cubes, pyramids, crystals, or other suitable forms, and the holder is arranged to receive and retain them in such position that one of the points or cutting-edges, with portions of the sides converging thereto, (which point or edge, with its converging sides, form what I denominate a cutting portion of the tool,) shall project beyond the holder sufficiently to freely cut the substance to be operated upon.

The tool-holders may be made either to fix the cutting-tools in one defined direction, or the angle or direction of the projecting point or cutting-edge may be varied by means of an adjustment in the holder itself.

The cutting-tools are to be made of steel or other metal, cast, forged, compressed, or ground into form, or mineral or other substances ground into shapes to suit the holders may be used. The holders are intended to be made and adjusted to the tool-rests of certain machines in which they are designed to operate, the advantages of this general arrangement being that one tool-holder provided with a set of my improved cutting-tools, of different sizes and forms, will suffice for a large number of different classes of work. Moreover, when any one of the several cutting portions of one of my improved tools is worn, the tool may be readily taken out of the holder and replaced so as to present to the work one of the unworn cutting portions of the same tool, thereby insuring the equivalent of at least four ordinary cutting-tools for each of my improved tools, and reducing the quantity of steel required, as well as making the tools themselves both harder and more durable in action, at the same time that the cost of steel used for any special tool will be reduced, and the quality and durability of the cutting portions considerably augmented.

The portion of the tool-holder which contains and gripes the cutting-tool may have an adjustment in the tool-holder itself, which permits the angle of the cutting-tool to be adapted to the work to be done in the most advantageous position suited to the material and the form required to be produced.

In order to enable others skilled in the art to make and use my invention, I proceed to describe the manner of carrying the same into practical effect, as illustrated by the accompanying drawings, wherein—

Figure 2:
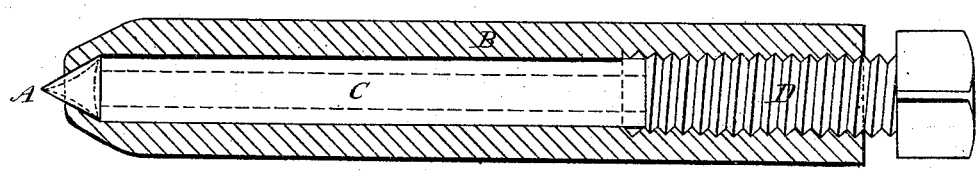

Figure 1 is a side elevation of one of my improved tools, with holder suitable for use in an ordinary lathe, planing or slotting machine, or for other purposes. The holder is arranged to keep the tool from heating by means of water or other cooling medium, if required. Fig. 2 is a plan of the above, partly in section.

A is the cutting-tool, which is capable of being readjusted to present another cutting point or angle when required. B is the tool-holder. C is a stem, of less diameter than the screw D, and it abuts against the tool A, holding the same firmly in place when operated upon by the said screw D. Around the stem C is a chamber, into which leads a pipe, E, through which is admitted a cooling-liquid to the tool A, or a lubricant, as desired.

Figure 5:
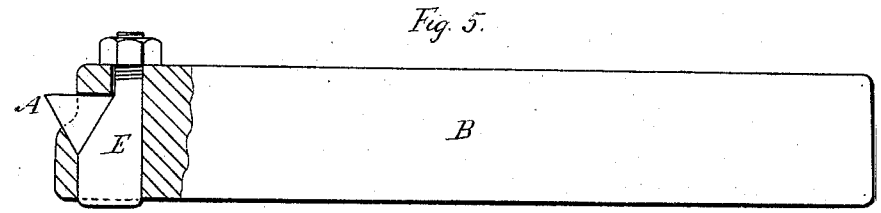
Figure 3:
Figure 4:

Fig. 3 is a section of the cutting-tool, and 4 is a plan of the same. Fig. 5 illustrates a modification of my apparatus, in which a wedge, E, is employed to tighten up the cutting-tool, the wedge being adjustable by means of a screw and nut, as shown.

The arrangements of apparatus shown in the views above referred to are for turning, planing, and slotting machine tools, or for other tools working upon straight cutting or turning work.

Figure 6:
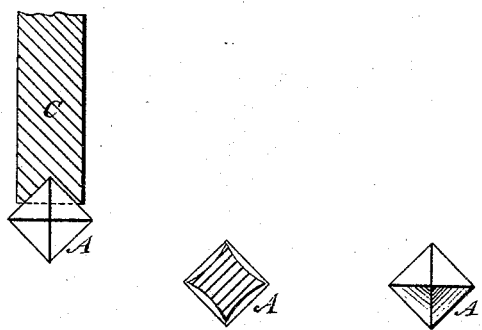

Fig. 6 illustrates the application of my invention for drilling purposes. In this case the tool is shown as being made in the form of a cube, A. C is the drill-spindle, by which the tool A is held within the holder, substantially in the manner already described with reference to previous figures.

I claim—

The tubular holder B, screw D, and stem C, in combination with the tool A and suitable means for supplying a cooling-liquid or a lubricant, as specified.

T. TAYLOR LINGARD.

Witnesses:
W. LLOYD WISE, *London.*
F. J. BROUGHAM, *London.*